United States Patent [19]
Nishii et al.

[11] Patent Number: 5,531,514
[45] Date of Patent: Jul. 2, 1996

[54] HYDRAULIC BRAKE SYSTEM FOR VEHICLE

[75] Inventors: Michiharu Nishii; Hiroshi Toda; Akihito Kusano; Yoshiki Noda, all of Aichi, Japan

[73] Assignee: Aisin Seiki Kabushiki Kaisha, Kariya, Japan

[21] Appl. No.: 450,722

[22] Filed: May 25, 1995

[30] Foreign Application Priority Data

May 26, 1994 [JP] Japan .................. 6-113121
Mar. 17, 1995 [JP] Japan .................. 7-058815

[51] Int. Cl.⁶ .......................................... B60T 8/32
[52] U.S. Cl. .................... 303/116.1; 303/116.2; 303/119.1; 303/900
[58] Field of Search ............... 303/119.1, 116.1, 303/116.2, 900, 901, 113.1, 113.2, 68–69, 113.5, 188, 149, 187, 186

[56] References Cited

U.S. PATENT DOCUMENTS

| | | | |
|---|---|---|---|
| 3,836,208 | 9/1974 | Wienecke | 303/900 |
| 3,866,983 | 2/1975 | Kondo | 303/900 |
| 4,153,307 | 5/1979 | Goebels | 303/119 |
| 4,418,966 | 12/1983 | Hattwig | 303/119.1 |
| 4,715,667 | 12/1987 | Otsuki et al. | 303/116.1 |
| 4,800,289 | 1/1989 | Adachi et al. | 303/900 |
| 4,952,002 | 8/1990 | Arikawa et al. | 303/116.1 |
| 5,167,443 | 12/1992 | Kervagoret | 303/116.1 |
| 5,205,623 | 4/1993 | Holzmann et al. | 303/116.1 |
| 5,246,280 | 9/1993 | Sigl | 303/119.1 |
| 5,265,948 | 11/1993 | Holzmann et al. | 303/116.1 |
| 5,275,476 | 1/1994 | Maisch | 303/116.1 |

FOREIGN PATENT DOCUMENTS

| | | |
|---|---|---|
| 4226646 | 2/1994 | Germany ............... 303/116.1 |
| 52-149568 | 12/1977 | Japan . |
| 62-134361 | 6/1987 | Japan . |
| 5-50910 | 3/1993 | Japan . |
| 5-507667 | 11/1993 | Japan . |

*Primary Examiner*—Douglas C. Butler
*Attorney, Agent, or Firm*—Burns, Doane, Swecker & Mathis

[57] ABSTRACT

In a hydraulic brake system for a vehicle, the brake fluid in a first wheel brake and the brake fluid in a second wheel brake, which are hydraulically connected to a pressure generating chamber of a master cylinder, are caused to individually flow into a low back pressure reservoir with the aid of an electromagnetic change-over valve and electromagnetic cut-off valves. The brake fluid in the low back pressure reservoir is caused to flow through a check valve and an orifice into the first wheel brake and through another check valve and another orifice into the second first wheel brake by the operation of a pump which is driven by an electric motor. With the pump in operation, the electromagnetic cut-off valves are individually operated so that the first and second wheel brakes are decreased or reincreased in hydraulic pressure. Thus, the system is low in manufacturing cost, being operable with only one pump and only one low back pressure reservoir.

7 Claims, 6 Drawing Sheets

HYDRAULIC BRAKE SYSTEM FOR VEHICLE

BACKGROUND OF THE INVENTION

1. Field of the Invention

This invention relates to a hydraulic brake system for a vehicle which performs anti-lock control, and more particular to a hydraulic brake system for a vehicle in which, with the aid of a control valve provided in a passage through which wheel brakes are hydraulically connected to a pressure generating chamber in a master cylinder, the wheel brakes are hydraulically isolated from the pressure generating chamber and hydraulically connected to a low back pressure reservoir, so that the brake fluid in the wheel brakes flows into the low back pressure reservoir, whereby the wheel brakes are decreased in hydraulic pressure; and with the aid of the control valve, the wheel brakes are hydraulically isolated from the pressure generating chamber and the low back pressure reservoir, and with the aid of a pump driven by an electric motor, the brake fluid in the low back pressure reservoir is caused to flow into the wheel brakes, so that the wheel brakes are reincreased in hydraulic pressure.

2. Description of the Related Art

A hydraulic brake system of this type is known in the art, being disclosed by Japanese Patent Unexamined Publication Nos. Sho 62-134361 and Hei 5-50910.

The hydraulic brake system disclosed by Japanese Patent Unexamined Publication No. Sho 62-134361 is designed as follows: With the aid of a control valve provided in a passage through which first and second wheel brakes are hydraulically connected to a pressure generating chamber in a master cylinder, the first and second wheel brakes are simultaneously hydraulically isolated from the pressure generating chamber and hydraulically connected to a low back pressure reservoir, so that the brake fluid in the first wheel brake and the brake fluid in the second wheel brake is caused to flow into the low back pressure reservoir, whereby the wheel brakes are decreased in hydraulic pressure at the same time. Furthermore, in the system, with the aid of the control valve, the first and second wheel brakes are hydraulically isolated from the pressure generating chamber and the low back pressure reservoir at the same time; and with the aid of a pump driven by an electric motor, the brake fluid in the low back pressure reservoir is caused to flow through a check valve into the first and second wheel brakes at the same time, so that the wheel brakes are reincreased in hydraulic pressure at the same time.

The hydraulic brake system disclosed by Japanese Patent Unexamined Publication No. Hei 5-50910 is designed as follows: Each of the first and second wheel brakes hydraulically connected through a passage to a pressure generating chamber of a master cylinder is provided with a low back pressure reservoir and a pump. A control valve comprising four two-port two-position type electromagnetic cut-off valves is able to individually hydraulically isolate the first and second wheel brakes from the pressure generating chamber and individually hydraulically connect them to the low back pressure reservoir, and it is able to hydraulically isolate the first and second wheel brakes individually from the pressure generating chamber and the low back pressure reservoir. The two pumps are driven by one electric motor, and the flow rate of brake fluid which is caused to flow into the wheel brakes by the pumps is smaller than the flow rate of brake fluid which is caused to flow from the wheel brakes into the low back pressure reservoir. With the anti-lock control hydraulic brake system thus designed, the first and second wheel brakes can be individually decreased or reincreased in hydraulic pressure.

On the other hand, there has been a demand for provision of an anti-lock control hydraulic brake system for a vehicle which is so designed that the hydraulic pressures of the first and second wheel brakes hydraulically connected to the pressure generating chamber of the master cylinder can be individually decreased or reincreased in hydraulic pressure, and which can be manufactured at low cost.

However, the above-described conventional hydraulic brake systems cannot meet this requirement. That is, the hydraulic brake system disclosed by Japanese Patent Unexamined Publication No. Sho 61-134361 is relatively low in manufacturing cost because it is relatively small in the numbers of electro-magnetic valves, pumps, and low back pressure reservoirs; however, it is unable to individually decrease or reincrease the hydraulic pressures of the first and second wheel brakes.

The hydraulic brake system disclosed by Japanese Patent Unexamined Publication No. Hei 5-50910 is able to individually decrease or reincrease the hydraulic pressures of the first and second wheel brakes; however, it is relatively high in manufacturing cost because it is large in the numbers of electromagnetic valves, pumps and low back pressure reservoirs.

SUMMARY OF THE INVENTION

In view of the foregoing, an object of this invention is to provide a hydraulic brake system for a vehicle which is so designed that first and second wheel brakes hydraulically connected to a pressure generating chamber of a master cylinder can be individually decreased or reincreased in hydraulic pressure, and which is low in manufacturing cost.

The foregoing object and other object of the invention has been achieved by the provision of a hydraulic brake system for a vehicle in which with the aid of a control valve provided in a passage through which first and second wheel brakes are hydraulically connected to a pressure generating chamber in a master cylinder, the first and second wheel brakes are hydraulically isolated from the pressure generating chamber and hydraulically connected to a low back pressure reservoir, so that the brake fluid in the first wheel brake and the brake fluid in the second wheel brake flow into the low back pressure reservoir, whereby the first and second wheel brakes are decreased in hydraulic pressure, and with the aid of the control valve, the first and second wheel brakes are hydraulically isolated from the pressure generating chamber and the low back pressure reservoir, and with the aid of a pump driven by an electric motor, the brake fluid in the low back pressure reservoir is caused to flow into the first and second wheel brakes, so that the first and second wheel brakes are reincreased in hydraulic pressure;

in which, according to the invention, the pump is operated to cause the brake fluid in the low back pressure reservoir to flow through a check valve and an orifice into the first wheel brake and through another check valve and another orifice into the second wheel brake, and the control valve enables the first and second wheel brakes individually to be hydraulically isolated from the pressure generating chamber and to be individually hydraulically connected to the low back pressure reservoir, and enables the first and second wheel brakes individually to be hydraulically isolated from the pressure generating chamber and the low back pressure reservoir, and the flow rate of the brake fluid caused to flow into the first wheel brake by the pump is smaller than the flow rate of the brake fluid which is caused to flow from the first wheel brake into the low back pressure reservoir, and the flow rate of the brake fluid which is caused to flow into the second wheel brake by the pump is smaller than the flow rate of the brake fluid which is caused to flow from the second wheel brake into the low back pressure reservoir.

In the hydraulic brake system, the control valve may be made up of four electromagnetic cut-off valves. However, the system may be decreased in the number of electromagnetic valves; that is, it may be reduced in manufacturing cost by designing the control valve as follows:

That is, the control valve, according to one aspect of the invention, comprises: an electromagnetic change-over valve for causing the first and second wheel brakes to be hydraulically isolated from the pressure generating chamber and to be hydraulically connected to the low back pressure reservoir; a first normally open electromagnetic cut-off valve for causing the first wheel brake to be hydraulically isolated from the electromagnetic change-over valve; and a second normally open electromagnetic cut-off valve for causing the second wheel brake to be hydraulically isolated from the electromagnetic change-over valve, the second normally open electromagnetic cut-off valve being operable independently of the first normally open electromagnetic cut-off valve. In addition, the control valve, according to another aspect of the invention, comprises: a first check valve for allowing only the flow of brake fluid from the pressure generating chamber to the first wheel brake; a second check valve for allowing only the flow of brake fluid from the pressure generating chamber to the second wheel brake; a normally open electromagnetic cut-off valve for isolating the first and second check valves from the first pressure generating chamber; a third check valve for allowing only the flow of brake fluid from the first wheel brake to the pressure generating chamber; a fourth check valve for allowing only the flow of brake fluid from the second wheel brake to the pressure generating chamber; a first normally closed electromagnetic cut-off valve for hydraulically connecting the first wheel brake to the low back pressure reservoir; and a second normally closed electromagnetic cut-off valve for hydraulically connecting the second wheel brake to the low back pressure reservoir, the second normally closed electromagnetic cut-off valve being operable independently of the first electro-magnetic cut-off valve.

When, in the hydraulic brake system, a brake operating force is applied to the master cylinder to brake the vehicle, a hydraulic pressure corresponding to the brake operating force is applied from the pressure generating chamber of the master cylinder to the first and second wheel brakes; that is, a braking force is applied to the first and second wheel brakes.

When, during anti-lock control, the control valve is operated to hydraulically isolate the first wheel brake and/or the second wheel brake from the pressure generating chamber of the master cylinder and to hydraulically connect them to the low back pressure chamber, the brake fluid in the first wheel brake and/or the second wheel brake is caused to flow through the control valve to the low pressure reservoir, so that the first wheel brake and/or the second wheel brake is decreased in hydraulic pressure.

Fundamentally, the pump is kept operated throughout the anti-lock control. Hence, the brake fluid flowing into the low back pressure reservoir from the first wheel brake and/or the second wheel brake is caused to flow into the first wheel brake through the check valve and the orifice, and into the second wheel brake through the check valve and the orifice which are different from the firstly mentioned ones. Because of the provision of the two orifices, the brake fluid discharged from the pump is divided into two parts which flow into the first and second brake wheels, respectively, whether or not there is a difference in hydraulic pressure between the first and second wheel brakes. In addition, because of the presence of the two check valves, the difficulty is eliminated that the brake fluid in one of the first and second wheel brakes which is higher in hydraulic pressure flows into the other wheel brake during the stroke of suction of the pump.

The flow rate of brake fluid which is caused to flow into the first wheel brake by the operation of the pump is made smaller than the flow rate of brake fluid which is caused to flow from the first wheel brake into the low back pressure reservoir; while the flow rate of brake fluid which is caused to flow into the second wheel brake by the operation of the pump is made smaller than the flow rate of brake fluid which is caused to flow from the second wheel brake into the low back pressure reservoir. Hence, when the control valve is operated to isolate the first wheel brake and/or the second wheel brake hydraulically from the pressure generating chamber and to connect them hydraulically to the low back pressure reservoir, the first wheel brake and/or the second wheel brake is continuously decreased in hydraulic pressure. In addition, when the control valve is operated to isolate the first wheel brake and/or second wheel brake hydraulically from the pressure generating chamber and the low back pressure reservoir, the flow of brake fluid from the first wheel brake and/or the second wheel brake is stopped, and the first wheel brake and/or the second wheel brake is reincreased in hydraulic pressure as brake fluid is caused to flow into it by the operation of the pump.

As was described above, in the hydraulic brake system of the invention, the first and second wheel brakes can be individually decreased or reincreased in hydraulic pressure. And the system is low in manufacturing cost, because it is operable with only one low back pressure reservoir and only one pump.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiments of the invention will be described with reference to the accompanying drawings.

First Embodiment

An example of a hydraulic brake system for a vehicle, which constitutes a first embodiment of the invention, will be described with reference to FIG. 1. The hydraulic brake system is provided for an FF vehicle (front-engine front-drive vehicle) in which a front left wheel brake for applying a braking force to the front left wheel which is a driving wheel and a rear right wheel brake for applying a braking force to the rear right wheel which is a driven wheel are hydraulically connected to a first pressure generating chamber of a tandem master cylinder, and a front right wheel brake for applying a braking force to the front right wheel which is a driving wheel and a rear left wheel brake for applying a braking force to the rear left wheel which is a driven wheel are hydraulically connected to a second pressure generating chamber of the master cylinder.

Figure 1:
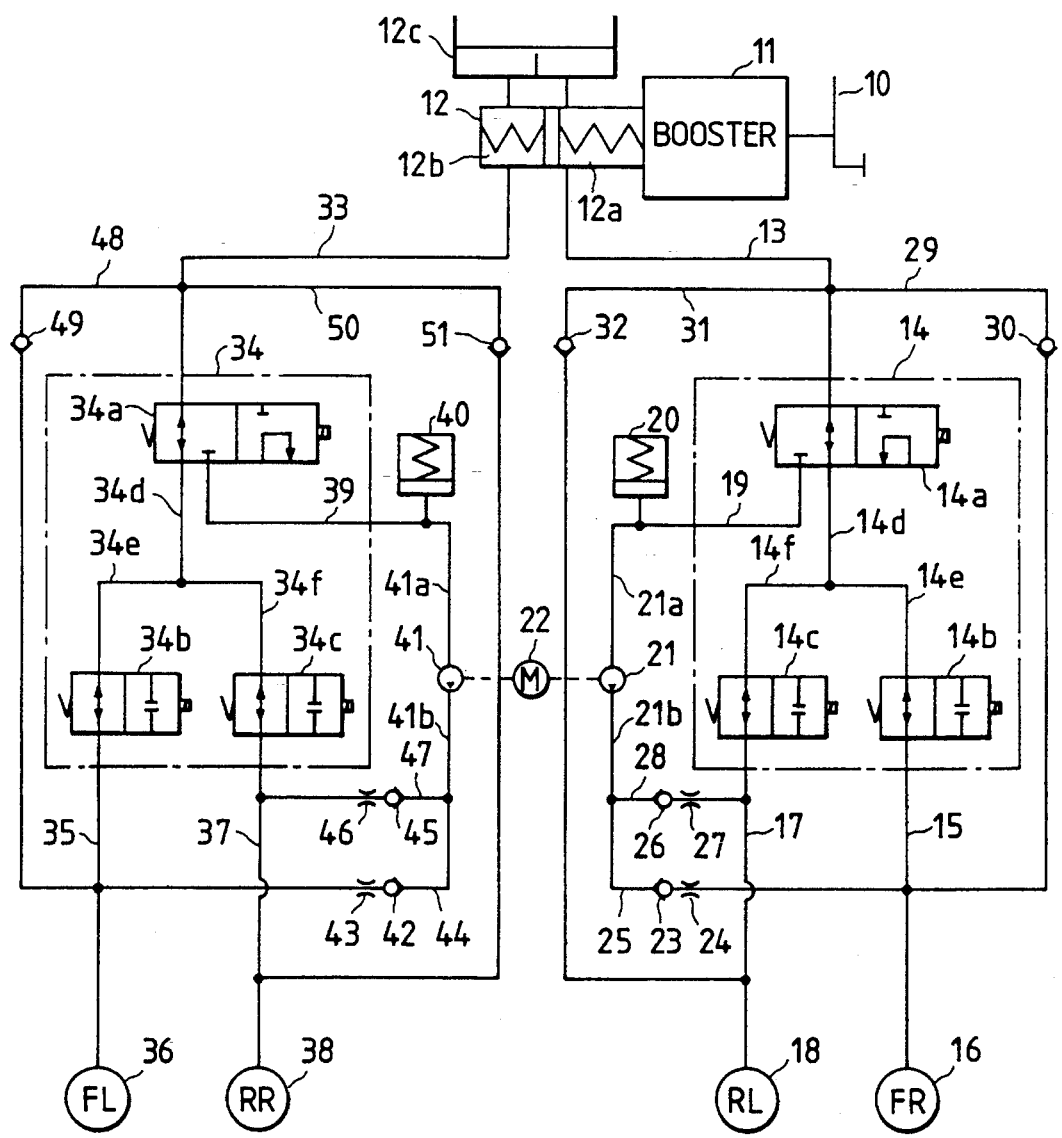
FIG. 1 is an example of a hydraulic brake system for a vehicle, which constitutes a first embodiment of the invention.

In the hydraulic brake system shown in FIG. 1, a brake operating force applied to a brake pedal 10 is increased by a negative pressure type booster 11, and applied to a tandem master cylinder 12 which comprises a first pressure generating chamber 12a and a second pressure generating chamber 12b. A master cylinder reservoir 12c is coupled to the master cylinder 12, to supply brake fluid to the first and second pressure generating chambers 12a and 12b.

The pressure generating chamber 12a of the master cylinder 12 is hydraulically connected through a passage 13, a control valve 14 and a passage 15 to a front right wheel brake 16, and through the passage 13, the control valve 14 and a passage 17 to a rear left wheel brake 18.

The control valve 14 comprises: a three-port two-position type electromagnetic change-over valve 14a; a two-port two-position type normally open electromagnetic cut-off valve 14b; and a two-port two-position type normally open electromagnetic cut-off valve 14c. The electromagnetic change-over valve 14a is hydraulically connected to the passage 13 and to a passage 14d which is hydraulically connected through passages 14e and 14f respectively to the passages 15 and 17. The electromagnetic change-over valve 14a operates to hydraulically isolate the front right wheel brake 16 and the rear left wheel brake 18 from the pressure generating chamber 12a selectively and simultaneously. Furthermore, the valve 14a is hydraulically connected through a passage 19 to a low back pressure reservoir 20. The normally open electromagnetic cut-off valve 14b is hydraulically connected to the passage 14e, and operates to hydraulically isolate the front right wheel brake 16 from the electromagnetic change-over valve 14 selectively. The normally open electromagnetic cut-off valve 14c is hydraulically connected to the passage 14f, and it operates to hydraulically isolate the rear left wheel brake 18 from the electromagnetic change-over valve 14a selectively.

The low back pressure reservoir 20 is a conventional one which is made up of a cylinder and a piston which is urged by a spring so that the liquid chamber therein be decreased in volume, to form a hydraulic chamber which is hydraulically connected to the passage 19.

The low back pressure reservoir 20 is hydraulically connected to a suction passage 21a of a pump 21. The pump 21 is a piston type pump having an inlet valve and a discharge valve. The pump 21 is driven by an electric motor 22. The discharge passage 21b of the pump 21 is hydraulically connected to the passage 17 through a passage 25 in which a check valve 23 and an orifice 24 are provided in series and through a passage 28 in which a check valve 26 and an orifice 27 are provided in series.

A bypass passage 29 which hydraulically connects the passage 13 to the passage 15, has a check valve 30 which allows only the flow of liquid from the passage 15 to the passage 13. A bypass passage 31 which hydraulically connects the passage 13 to the passage 17, has a check valve 32 which allows only the flow off liquid from the passage 17 to the passage 13.

The pressure generating chamber 12b of the master cylinder 12 is hydraulically connected to the front left wheel brake 36 through a passage 33, a control valve 34 and a passage 35, and also to the rear right wheel brake 38 through the passage 33, the control valve 34 and a passage 37.

The control valve 34 comprises: a three-port two-position type electromagnetic change-over valve 34a; a two-port two-position type normally open electromagnetic cut-off valve 34b; and a two-port two-position type normally open electromagnetic cut-off valve 34c. The electromagnetic change-over valve 34a is hydraulically connected to the passage 33 and to a passage 34d which is hydraulically connected through passages 34e and 34f respectively to the passages 35 and 37. The electromagnetic change-over valve 14a operates to hydraulically isolate the front left wheel brake 36 and the rear right wheel brake 38 from the pressure generating chamber 12b selectively and simultaneously. Furthermore, the valve 34a is hydraulically connected through a passage 39 to a low back pressure reservoir 40. The normally open electromagnetic cut-off valve 34b is hydraulically connected to the passage 34e, and operates to hydraulically isolate the front left wheel brake 36 from the electromagnetic change-over valve 34 selectively. The normally open electromagnetic cut-off valve 34c is hydraulically connected to the passage 34f, and operates to hydraulically isolate the rear right wheel brake 38 from the electromagnetic change-over valve 34a selectively.

The low back pressure reservoir 40 is a conventional one which is made up of a cylinder and a piston which is urged by a spring so that the liquid chamber therein be decreased in volume, to form a hydraulic chamber which is hydraulically connected to the passage 39.

The low back pressure reservoir 40 is hydraulically connected to the inlet passage 41a of a pump 41. The pump 41 is a piston type pump having an inlet valve and a discharge valve. The pump 41 is driven by the aforementioned electric motor 22. The discharge passage 41b of the pump 41 is hydraulically connected to the passage 35 through a passage 44 in which a check valve 42 and an orifice 43 are provided in series and through a passage 47 in which a check valve 45 and an orifice 46 are provided in series.

A bypass passage 48 which hydraulically connects the passage 33 to the passage 35, has a check valve 49 which allows only the flow of liquid from the passage 35 to the passage 33. A bypass passage 50 which hydraulically connects the passage 33 to the passage 37, has a check valve 51 which allows only the flow of liquid from the passage 37 to the passage 33.

When the vehicle is braked, the electromagnetic change-over valves 14a and 34a, the electromagnetic cut-off valves 14b, 14c, 34b and 34c, and the electric motor 22 are electrically operated by an electronic control unit which utilizes the output signals of rotation sensors provided for the front right wheel, the rear left wheel, the front left wheel and the rear right wheel (hereinafter referred to as "four wheels", when applicable), to determine whether the hydraulic pressure should be decreased or whether it should be reincreased for each of the front right wheel brake 16, rear left wheel brake 18, front left wheel brake 36 and rear right wheel brake 38 (hereinafter referred to as "four wheel brakes", when applicable).

Until the brake pedal 10 is depressed during the traveling of the vehicle, the electromagnetic change-over valves 14a and 34a and the electromagnetic cut-off valves 14b, 14c, 34b and 34c are kept positioned as shown in FIG. 1, and the electric motor 22 is not operated.

Upon depression of the brake pedal 10, the brake fluid is supplied from the pressure generating chamber 12a of the master cylinder 12 through the passage 13, the control valve 14 and the passage 15 to the front right wheel brake, and through the passage 13, the control valve 14 and the passage 17 to the rear left wheel brake 18. At the same time, the brake fluid is supplied from the pressure generating chamber 12b of the master cylinder 12 through the passage 33, the control valve 34 and the passage 35 to the front left wheel brake 36, and through the passage 33, the control valve 34 and the passage 37 to the rear right wheel brake 38. In this operation, the brake fluid in the passage 13 flows through the electromagnetic change-over valve 14a and the electromagnetic cut-off valve 14b to the passage 15, and at the same time it flows through the electromagnetic change-over valve 14a and the electromagnetic cut-off valve 14c to the passage 17; while the brake fluid in the passage 33 flows through the electromagnetic change-over valve 34a and the electromagnetic cut-off valve 34b to the passage 35, and at the same time it flows through the electromagnetic change-over valve 34a and the electromagnetic cut-off valve 34c to the passage 37. As a result, the hydraulic pressures of the front right wheel brake 16, the rear left wheel brake 18, the front left wheel brake 36 and the rear right wheel brake 38 are increased; that is, the front right wheel brake 16, the rear left wheel brake 18, the front left wheel brake 36 and the rear right wheel brake 38 apply braking forces to the front right wheel, the rear left wheel, the front left wheel and the rear right wheel, respectively. Where none of the four wheels tend to be locked, the hydraulic pressures of the front right wheel brake 16, the rear left wheel brake 18, the front left wheel brake 36 and the rear right wheel brake 38 correspond to the force of depression applied to the brake pedal.

When the brake pedal 10 is released, the hydraulic pressures in the pressure generating chambers 12a and 12b are decreased. Hence, the brake fluid in the front right wheel brake 16 is returned through the passage 15 and the passage 13 to the pressure generating chamber 12a, and the brake fluid in the rear left wheel brake 18 is returned through the passage 17 and the passage 13 to the pressure generating chamber 12a; and the brake fluid in the front left wheel brake 36 is returned through the passage 35 and the passage 33 to the pressure generating chamber 12b, and the brake fluid in the rear right wheel brake 38 is returned through the passage 37 and the passage 33 to the pressure generating chamber 12b, so that the hydraulic pressures in the front right wheel brake 16, the rear left wheel brake 18, the front left wheel brake 36 and the rear right wheel brake 38 are decreased. In this operation, the brake fluid in the passage 15 flows through the electromagnetic cut-off valve 14b and the electromagnetic change-over valve 14 to the passage 13 on one hand and it flows through the bypass passage 29 to the passage 13 on the other hand, and the brake fluid in the passage 17 flows through the electromagnetic cut-off valve 14c and the electromagnetic change-over valve 14a to the passage 13 on one hand and it flows through the bypass passage 31 to the passage 13 on the other hand; while the brake fluid in the passage 35 flows through the electromagnetic cut-off valve 34b and the electromagnetic change-over valve 34a to the passage 33 on one hand, and it flows through the bypass passage 48 to the passage 33 on the other hand, and the brake fluid in the passage 37 flows through the electromagnetic cut-off valve 34c and the electromagnetic change-over valve 34a to the passage 33 on one hand, and it flows through the bypass passage 50 to the passage 33 on the other hand.

When, with the brake pedal depressed, any one of the four wheels tends to be locked — for instance the rear left wheel tends to be locked, then the electronic control unit determines that the rear left wheel brake 18 should be decreased in hydraulic pressure, and operates the electromagnetic change-over valve 14a and the electromagnetic cut-off valve 14b and operates the electric motor 22 simultaneously. Because the electromagnetic change-over valve 14a is operated in this manner, the rear left wheel brake 18 is hydraulically connected through the passage 17, the electromagnetic cut-off valve 14c, the electromagnetic change-over valve 14a and the passage 19 to the low back pressure reservoir 20, so that the brake fluid in the rear left wheel brake 18 starts to flow to the low back pressure reservoir 20, and accordingly the hydraulic pressure in the rear left wheel brake 18 starts to decrease. In this operation, since the front right wheel brake 16 has been hydraulically isolated from the electromagnetic change-over valve 14a by the operation of the electromagnetic cut-off valve 14b, the brake fluid in the front right wheel brake 16 is prevented from flowing into the low back pressure reservoir 20.

The pump 21, being driven by the electric motor 22, draws the brake fluid through the inlet passage 21a which flows into the low back pressure reservoir 20 from the rear left wheel brake 18, and causes it to flow not only through the discharge passage 21b and the passage 25 to the passage 15 but also through the discharge passage 21b and the passage 28 to the passage 17. That is, since the passages 25 and 28 have the orifices 24 and 27, respectively, the hydraulic pressure of the discharge passage 21b becomes higher than the hydraulic pressure in the front right wheel brake 16 which is higher than that of the rear left wheel brake 18, so that the brake fluid in the discharge passage 21b is divided into two parts which flow into the passage 15 and the passage 17, respectively. The ratio of the flow rate of the brake fluid flowing into the passage 15 to the flow rate of the brake fluid flowing into the passage 17 depends on the ratio of the area of the orifice 24 to the area of the orifice 27. The check valve 23 eliminates the difficulty that, when the pump 21 is in the stroke of suction, the brake fluid in the front right wheel brake 16 which is higher in hydraulic pressure, flows through the passages 25 and 28 to the rear left wheel brake 18 which is lower in hydraulic pressure.

As the pump 21 is operated, the brake fluid is caused to flow from the low back pressure reservoir 20 to the passage 17, and accordingly to the rear left wheel brake 18 in the above-described manner. In this case, the flow rate of the brake fluid is much smaller than the flow rate of the brake fluid which flows from the rear left wheel brake 18 through the passage 17, the electromagnetic cut-off valve 14c, the electromagnetic change-over valve 14a, and the passage 19 to the low back pressure reservoir 20, and therefore the hydraulic pressure in the rear left wheel brake 18 is decreased continuously. Since the flow of brake fluid from the front right wheel brake 16 has been stopped by the operation of the electromagnetic cut-off valve 14b, the front right wheel brake 16 is increased in hydraulic pressure as the brake fluid is caused to flow into it by the operation of the pump 21.

When the tendency of locking the rear left wheel is eliminated, the electronic control unit determines that the rear left wheel brake 18 should be increased in hydraulic pressure, and operates the electromagnetic cut-off valve 14c to stop the flow of brake fluid from the rear left wheel brake 18 to the low back pressure reservoir 20. As a result, the hydraulic pressure in the rear left wheel brake 18 is reincreased as the brake fluid flows into it by the operation of the pump 21.

When the electric motor 22 operates, the pump 41 is driven by it; however, in this case, the low back pressure reservoir 40 is empty, and therefore the pump 41 is spun.

When, for instance, the rear right wheel tends to be locked while the hydraulic pressure in the rear left wheel brake 18 is being controlled, the electronic control unit determines that the rear right wheel brake 38 should be decreased in hydraulic pressure, and operates the electromagnetic change-over valve 34a and the electromagnetic cut-off valve 34b. As the electromagnetic change-over valve 34a is operated in this manner, the rear right wheel brake 38 is hydraulically connected through the passage 37, the electromagnetic cut-off valve 34c, the electromagnetic change-over valve 34a and the passage 39 to the low back pressure reservoir 40, so that the brake fluid in the rear right wheel brake 38 starts to flow to the low back pressure reservoir 40, and accordingly the hydraulic pressure in the rear right wheel brake 38 starts to decrease. In this operation, since the front left wheel brake 36 has been hydraulically isolated from the electromagnetic change-over valve 34a by the operation of the electromagnetic cut-off valve 34b, the brake fluid in the front right wheel brake 16 is prevented from flowing to the low back pressure reservoir 40.

The pump 41, being driven by the electric motor 22, draws the brake fluid through the inlet passage 41a which flows into the low back pressure reservoir 40 from the rear right wheel brake 38, and causes it to flow not only through the discharge passage 41b and the passage 44 to the passage 35 but also through the discharge passage 41b and the passage 47 to the passage 37. That is, since the passages 44 and 47 have the orifices 43 and 46, respectively, the hydraulic pressure in the discharge passage 41b becomes higher than the hydraulic pressure in the front right wheel brake 36 which is higher than that of the rear right wheel brake 38, so that the brake fluid in the discharge passage 41b is divided into two parts which flow into the passages 35 and 37, respectively. The check valve 42 eliminates the difficulty that, when the pump 41 is in the stroke of suction, the brake fluid in the front left wheel brake 16 which is higher in hydraulic pressure flows through the passages 44 and 47 to the rear right wheel brake 38 which is lower in hydraulic pressure.

As the pump 41 is operated, the brake fluid is caused to flow from the low back pressure reservoir 40 to the passage 37, and accordingly to the rear right wheel brake 38 in the above-described manner. In this case, the flow rate of the brake fluid is made much smaller than the flow rate of the brake fluid which flows from the rear right wheel brake 38 through the passage 37, the electromagnetic cut-off valve 34c, the electromagnetic change-over valve 34a and the passage 39 to the low back pressure reservoir 40, and therefore the hydraulic pressure in the rear left wheel brake 18 is decreased continuously. Since the flow of brake fluid from the front left wheel brake 36 has been stopped by the operation of the electromagnetic cut-off valve 34b, the hydraulic pressure in the front left wheel brake 36 is increased as the brake fluid flows into it by the operation of the pump 41.

When the tendency of locking the rear right wheel is eliminated, the electronic control unit determines that the rear right wheel brake 38 should be increased in hydraulic pressure, and operates the electromagnetic cut-off valve 34c to stop the flow of brake fluid from the rear right wheel brake 38 to the low back pressure reservoir 40. As a result, the hydraulic pressure in the rear right wheel brake 38 is reincreased as the brake fluid flows into it by the operation of the pump 41.

When for instance the front right wheel and the front left wheel tend to be locked while the hydraulic pressure in the rear left wheel brake 18 and the liquid quid pressure of the rear right wheel brake 38 are being controlled, the electronic control unit determines that the front right wheel brake 16 and the front left wheel brake 38 should be decreased in hydraulic pressure, and releases the electromagnetic cut-off valves 14b and 34b. As the electromagnetic cut-off valve 14b is released in this manner, the brake fluid in the front right wheel brake 16 flows through the passage 15, the electromagnetic cut-off valve 14b, the electromagnetic change-over valve 14a, and the passage 19 to the low back pressure reservoir 20. On the other hand, the brake fluid is supplied to the front right brake 16 by the operation of the pump 21; however, the flow rate of the brake fluid is much smaller than the flow rate of the brake fluid which flows from the front right wheel brake 16 to the low back pressure reservoir 20, and therefore the hydraulic pressure in the front right wheel brake 16 starts to decrease. Similarly as in the above-described case, as the electromagnetic cut-off valve 34b is released, the brake fluid in the front left wheel brake 36 flows through the passage 35, the electromagnetic cut-off valve 34b, the electromagnetic change-over valve 34a, and the passage 39 to the low back pressure reservoir 40. In this operation, the brake fluid is caused to flow to the front left wheel brake 36 by the operation of the pump 41; however, the flow rate of the brake fluid is much smaller than the flow rate of the brake fluid which flows from the front left wheel brake 36 to the low back pressure reservoir 40, and therefore the hydraulic pressure in the front left wheel brake 36 starts to decrease.

When the tendency of locking the front right wheel is eliminated by decreasing of the hydraulic pressure in the front right wheel brake 16, the electronic control unit determines that the hydraulic pressure in the front right wheel brake 16 should be reincreased, and operates the electromagnetic cut-off valve 14b again to stop the flow of brake fluid from the front right wheel brake 16 to the low back pressure reservoir 20. As a result, the front right wheel brake 16 is reincreased in hydraulic pressure as the brake fluid flows into it by the operation of the pump 21. Similarly as in the above-described case, when the tendency of locking the front left wheel is eliminated by the hydraulic pressure in the front left wheel brake 36, the electronic control unit determines that the hydraulic pressure in the front left wheel brake 36 should be reincreased, and operates the electromagnetic cut-off valve 34b again to stop the flow of brake fluid from the front left wheel brake 36 to the low back pressure reservoir 40. As a result, the front left wheel brake 36 is reincreased in hydraulic pressure as the brake fluid flows into it by the operation of the pump 41.

As was described above, the hydraulic pressure in the front right wheel brake 16 and the hydraulic pressure in the rear left wheel brake 18 can be individually decreased or reincreased by individually activating or releasing the electromagnetic cut-off valves 14b and 14c with the electromagnetic change-over valve 14a and the electric motor 22 operated. Similarly, the hydraulic pressure in the front left wheel brake 36 and the hydraulic pressure in the rear right wheel brake 38 can be individually decreased or reincreased by individually activating or releasing the electromagnetic cut-off valves 34b and 34c with the electromagnetic change-over valve 34a and the electric motor 22 operated. And, when, while the front right wheel brake 16 and the rear left wheel brake 18 are being reincreased in hydraulic pressure with the electromagnetic cut-off valves 14b and 14c operated, the electromagnetic change-over valve 14a is released and the electromagnetic cut-off valve 14b and/or the electromagnetic cut-off valve 14c is released, the brake fluid is caused to flow from the pressure generating chamber 12a into the front right wheel brake 16 and/or the rear left wheel brake 18 to quickly increase the hydraulic pressure in the front right wheel brake 16 and/or the hydraulic pressure in the rear left wheel brake 18. Similarly, when, while the front left wheel brake 36 and the rear right wheel brake 38 are being reincreased in hydraulic pressure with the electromagnetic cut-off valves 34b and 34c operated, the electromagnetic change-over valve 34a is released and the electromagnetic cut-off valve 34b and/or the electromagnetic cut-off valve 34c is released, the brake fluid is caused to flow from the pressure generating chamber 12b into the front left wheel brake 36 and/or the rear right wheel brake 38 to quickly increase the hydraulic pressure in the front left wheel brake 36 and/or the hydraulic pressure in the rear right wheel brake 38.

Let us consider the case where, while the front right wheel brake 16, the rear left wheel brake 18, the front left wheel brake 36 and the rear right wheel brake 38 are being decreased in hydraulic pressure, the force of depression applied to the brake pedal is greatly decreased so that the hydraulic pressures in the pressure generating chambers 12a and 12b are greatly decreased, thus becoming lower than the hydraulic pressures in the front right wheel brake 16, the rear left wheel brake 18, the front left wheel brake 36 and the rear right wheel brake 38. In this case, the brake fluid in the front right wheel brake 16 and the brake fluid in the rear left wheel brake 18 return respectively through the bypass passages 29 and 31 to the pressure generating chamber 12a, while the brake fluid in the front left wheel brake 36 and the brake fluid in the rear right wheel brake 38 return respectively through the bypass passages 48 and 50 to the pressure generating chamber 12b. As a result, the hydraulic pressure in the front right wheel brake 16 and the hydraulic pressure in the rear left wheel brake 18 are decreased to the hydraulic pressure in the pressure generating chamber 12a, while the hydraulic pressure in the front left wheel brake 36 and the hydraulic pressure in the rear right wheel brake 38 are decreased to the hydraulic pressure in the pressure generating chamber 12b.

In the embodiment shown in FIG. 1, in increasing the hydraulic pressures of the front right wheel brake 16, the rear left wheel brake 18, the front left wheel brake 36 and the rear right wheel brake 38 by depressing the brake pedal 10, the electromagnetic cut-off valves 14c and 34c are operated, so that the rear left wheel brake 18 and the rear right wheel brake 38 are made lower in hydraulic pressure than the front right wheel brake 16 and the front left wheel brake 36. Hence, if the wheel behavior in response to which the electronic control unit operates the electromagnetic cut-off valves 14c and 34c is determined on the fact that the front wheels are locked earlier, then the hydraulic pressure control may be carried out for a so-called "front and rear braking force distribution control".

Since the check valves 23, 26, 42 and 45 are provided, the discharge valves of the pumps 21 and 41 may be omitted.

Second Embodiment

Another example of the hydraulic brake system, which constitutes a second embodiment of the invention, will be described with reference to FIG. 2. The hydraulic brake system is for an FF vehicle (front-engine front-drive vehicle) in which a front left wheel brake for applying a braking force to the front left wheel which is a driving wheel and a rear right wheel brake for applying a braking force to the rear right wheel which is a driven wheel are hydraulically connected to a first pressure generating chamber of a tandem master cylinder, and a front right wheel brake for applying a braking force to the front right wheel which is a driving wheel and a rear left wheel brake for applying a braking force to the rear left wheel which is a driven wheel are hydraulically connected to a second pressure generating chamber of the master cylinder.

Figure 2:
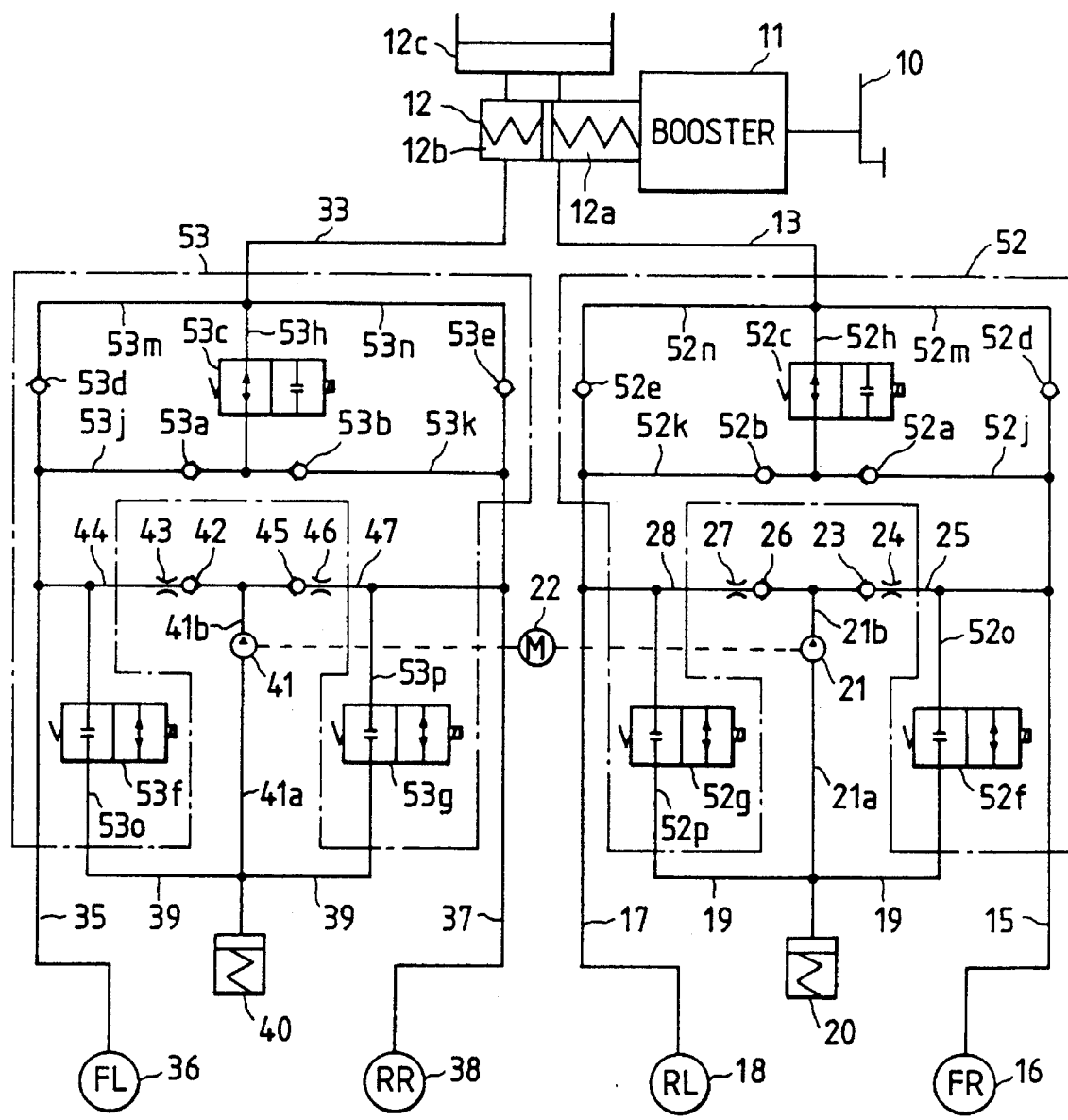
FIG. 2 is another example of the hydraulic brake system, which constitutes a second embodiment of the invention.

In FIG. 2, parts corresponding functionally to those which have been described with reference to FIG. 1 are therefore designated by the same reference numerals or characters. As shown in FIG. 2, a master cylinder 12 has a pressure generating chambers 12a and 12b. The pressure generating chamber 12a is hydraulically connected through a passage 13, a control valve 52 and a passage 15 to a front right wheel brake 16, and through the passage 13, the control valve 52 and a passage 17 to a rear left wheel brake 18; while the pressure generating chamber 12b is hydraulically connected through a passage 33, a control valve 53 and a passage 35 to a front left wheel brake 36, and through the passage 33, the control valve 53 and a passage 37 to a rear right wheel brake 38.

The control valve 52 comprises: a check valve 52a provided in a passage 52j which hydraulically connects the passage 15 to a passage 52h hydraulically connected to the passage 13, to allow only the flow of brake fluid from the pressure generating chamber 12a to the front right brake 16; a check valve 52b which is provided in a passage 52k hydraulically connecting the passage 52h to the passage 17, to allow only the flow of brake fluid from the pressure generating chamber 12a to the rear left wheel brake 18; a two-port two-position type normally open electromagnetic cut-off valve 52c which is provided in the passage 52h to hydraulically isolate the check valves 52a and 52b selectively and simultaneously from the, pressure generating chamber 12a; a check valve 52d which is provided in a passage 52m hydraulically connecting the passage 13 to the passage 15, to allow only the flow of brake fluid from the front right wheel brake 16 to the pressure generating chamber 12a; a check valve 52e which is provided in a passage 52n hydraulically connecting the passage 13 to the passage 17, to permit only the flow of brake fluid from the rear left wheel brake 18 to the pressure generating chamber 12a; a two-port two-position type normally closed electromagnetic cut-off valve 52f provided in a passage 52o which hydraulically connects a passage 19 to a part of a passage 25 which is located between an orifice 24 and the passage 15, to hydraulically connect the front right wheel brake 16 selectively to a low back pressure reservoir 20; and a two-port two-position type normally closed electromagnetic cut-off valve 52g provided in a passage 52p which hydraulically connects the passage 19 to a part of a passage 28 which is located between an orifice 27 and the passage 17, to hydraulically connect the rear left wheel brake 18 selectively to the low back pressure reservoir 20.

The control valve 53 comprises: a check valve 53a provided in a passage 53j which hydraulically connects the passage 35 to a passage 53h hydraulically connected to the passage 33, to allow only the flow of brake fluid from the pressure generating chamber 12b to the front left brake 36; a check valve 53b which is provided in a passage 53k hydraulically connecting the passage 53h to the passage 37, to allow only the flow of brake fluid from the pressure generating chamber 12b to the rear right wheel brake 38; a two-port two-position type normally open electromagnetic cut-off valve 53c which is provided in the passage 53h to hydraulically isolate the check valves 53a and 53b selectively and simultaneously from the, pressure generating chamber 12b; a check valve 53d which is provided in a passage 53m hydraulically connecting the passage 33 to the passage 35, to allow only the flow of brake fluid from the front left wheel brake 36 to the pressure generating chamber 12b; a check valve 53e which is provided in a passage 53n hydraulically connecting the passage 33 to the passage 37, to permit only the flow of brake fluid from the rear right wheel brake 38 to the pressure generating chamber 12b; a two-port two-position type normally closed electromagnetic cut-off valve 53f provided in a passage 53o which hydraulically connects a passage 39 to a part of a passage 44 which is located between an orifice 43 and the passage 35, to hydraulically connect the front left wheel brake 36 selectively to a low back pressure reservoir 40; and a two-port two-position type normally closed electromagnetic cut-off valve 53g provided in a passage 52p which hydraulically connects the passage 39 to a part of a passage 47 which is located between an orifice 46 and the passage 37, to hydraulically connect the rear right wheel brake 38 selectively to the low back pressure reservoir 40.

The passages 52m, 52n, 53m and 53n serve also as bypass passages.

Similarly as in the case of the first embodiment shown in FIG. 1, the electromagnetic cut-off valves 52c, 52f, 52g, 53c, 53f and 53g, and the electric motor 22 are electrically operated by an electronic control unit.

When, in the second embodiment shown in FIG. 2, the brake pedal 10 is depressed, the brake fluid in the pressure generating chamber 12a of the master cylinder 12 is supplied through the passage 13, the control valve 52 and the passage 15 to the front right wheel brake 16 and through the passage 13, the control valve 52 and the passage 17 to the rear left wheel brake 18. At the same time, the brake fluid in the pressure generating chamber 12b of the master cylinder 12 is supplied through the passage 33, the control valve 53 and the passage 35 to the front left wheel brake 36, and through the passage 33, the control valve 53 and the passage 37 to the rear right wheel brake 38. In this operation, the brake fluid in the passage 13 flows not only through the electromagnetic cut-off valve 52c and the check valve 52a to the passage 15 but also through the electromagnetic cut-off valve 52c and the check valve 52b to the passage 17, while the brake fluid in the passage 33 flows not only through the electromagnetic cut-off valve 53c and the check valve 53a to the passage 35 but also through the electromagnetic cut-off valve 53c and the check valve 53b to the passage 37.

When the brake pedal 10 is released, the pressure generating chambers 12a and 12b are decreased in hydraulic pressure. As a result, the brake fluid in the front right wheel brake 16 flows through the passage 15, the control valve 52 and the passage 13 to the pressure generating chamber 12, and the brake fluid in the rear left wheel brake 18 flows through the passage 17, the control valve 52 and the passage 13 to the pressure generating chamber 12a, and the brake fluid in the front left wheel brake 36 flows through the passage 35, the control valve 53 and the passage 33 to the pressure generating chamber 12b, and the brake fluid in the rear right wheel brake 38 flows through the passage 37, the control valve 53 and the passage 33 to the pressure generating chamber 12b, so that the front right wheel brake 16, the rear left wheel brake 18, the front left wheel brake 36 and the rear right wheel brake 38 are all decreased in hydraulic pressure. In this operation, the brake fluid in the passage 15 and the brake fluid in the passage 17 flow respectively through the check valves 52d and 52c to the passage 13, while the brake fluid in the passage 35 and the brake fluid in the passage 37 flow respectively through the check valves 53d and 53c to the passage 33.

When, with the brake pedal 10 depressed, for instance the electromagnetic cut-off valves 52c and 52f are operated and the electric motor 22 is operated, the front right wheel brake 16 is hydraulically isolated from the pressure generating chamber 12a and hydraulically connected to the low back pressure, reservoir 20, while the rear left wheel brake 18 is hydraulically isolated from the pressure generating chamber 12a and the low back pressure reservoir 20. As a result, the brake fluid the front right wheel brake 16 flows through the electromagnetic cut-off valve 52f to the low back pressure reservoir 20, so that the front right wheel brake 16 starts to decrease in hydraulic pressure. The brake fluid flowing in the low back pressure reservoir 20 is caused to flow into the front right wheel brake 16 and the rear left wheel brake 18 by the operation of the pump 21. In this case, the flow rate of the brake fluid which is caused to flow into the front right wheel brake 16 by the operation of the pump 21 is made much smaller than the flow rate of the brake fluid which flows from the front right wheel brake 16 to the low back pressure reservoir 20, and therefore the front right wheel brake 16 is continuously decreased in hydraulic pressure.

The rear left wheel brake 18 is increased in hydraulic pressure as the brake fluid flows into it by the operation of the pump 21. When the electromagnetic cut-off valve 52f is released, the front right wheel brake 16 is hydraulically isolated from both the pressure generating chamber 12a and the low back pressure reservoir 20, so that the front right wheel brake 16 is reincreased in hydraulic pressure as the brake fluid flows into it by the operation of the pump 21.

When the electromagnetic cut-off valve 52g is operated while the hydraulic pressure in the front right wheel brake 16 is being controlled, the rear left wheel brake 18 is hydraulically isolated from the pressure generating chamber 12a and hydraulically connected to the low back pressure reservoir 20, so that the brake fluid in the rear left wheel brake 18 flows to the low back pressure reservoir 20. In this operation, since the flow rate of the brake fluid which flows into the rear left wheel brake 18 by the operation of the pump 21 is much smaller than the flow rate of the brake fluid which flows from the rear left wheel brake 18 to the low back pressure reservoir 20, the rear left wheel brake 18 is decreased in hydraulic pressure. When the electromagnetic cut-off valve 52g is released, the rear left wheel brake 18 is reincreased in hydraulic pressure as the brake fluid flows into it by the operation of the pump 21.

Similarly as in the above-described case, the front left wheel brake 36 and the rear right wheel brake 38 can be decreased or reincreased in hydraulic pressure by driving the pump 41 with the electric motor 22 and by operating the electromagnetic cut-off valves 53c, 53f and 53g.

Third Embodiment

Another example of the hydraulic brake system, which constitutes a third embodiment of the invention, will be described with reference to FIG. 3. The hydraulic brake system is also provided for an FF vehicle (front-engine front-drive vehicle) in which a front left wheel brake for applying a braking force to the front left wheel which is a driving wheel and a rear right wheel brake for applying a braking force to the rear right wheel which is a driven wheel are hydraulically connected to a first pressure generating chamber of a tandem master cylinder, and a front right wheel brake for applying a braking force to the front right wheel which is a driving wheel and a rear left wheel brake for applying a braking force to the rear left wheel which is a driven wheel are hydraulically connected to a second pressure generating chamber of the master cylinder.

Figure 3:
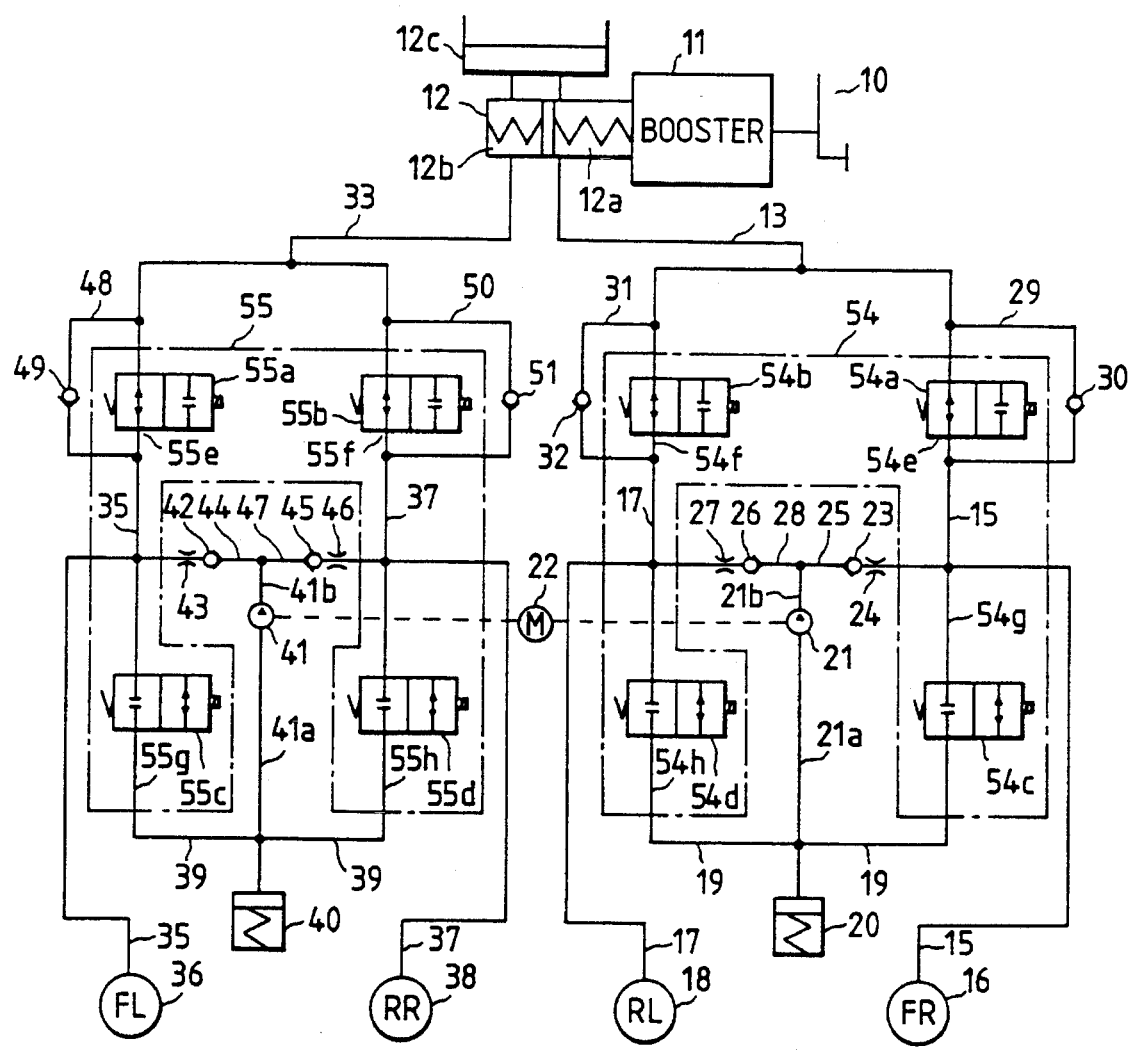
FIG. 3 is another example of the hydraulic brake system, which constitutes a third embodiment of the invention.

In FIG. 3, parts corresponding functionally to those which have been described with reference to FIG. 1 are therefore designated by the same reference numerals or characters. As shown in FIG. 3, a master cylinder 12 has pressure generating chambers 12a and 12b. The pressure generating chamber 12a is hydraulically connected through a passage 13, a control valve 54 and a passage 15 to a front right wheel brake 16, and through the passage 13, the control valve 54 and a passage 17 to a rear left wheel brake 18; while the pressure generating chamber 12b is hydraulically connected through a passage 33, a control valve 55 and a passage 35 to a front left wheel brake 36, and through the passage 33, the control valve 55 and a passage 37 to a rear right wheel brake 38.

The control valve 54 comprises: a two-port two-position type normally open electromagnetic cut-off valve 54a which is provided in a passage 54e hydraulically connecting the passage 13 to the passage 15, to hydraulically isolate the front right wheel brake 16 selectively from the pressure generating chamber 12a; a two-port two-position type normally open electromagnetic cut-off valve 54b which is provided in a passage 54f hydraulically connecting the passage 13 to the passage 17, to hydraulically isolate the rear left wheel brake 18 selectively from the pressure generating chamber 12a; a two-port two-position type normally closed electromagnetic cut-off valve 54c which is provided in a passage 54g hydraulically connecting the passage 15 to a passage 19, to hydraulically connect the front right wheel brake 16 selectively to a low back pressure reservoir 20; and a two-port two-position type normally closed electromagnetic cut-off valve 54d which is provided in a passage 54h hydraulically connecting the passage 17 to the passage 19, to hydraulically connect the rear left wheel brake 18 selectively to the low back pressure reservoir 20.

Similarly, the control valve 55 comprises: a two-port two-position type normally open electromagnetic cut-off valve 55a which is provided in a passage 55e hydraulically connecting the passage 33 to the passage 35, to hydraulically isolate the front left wheel brake 36 selectively from the pressure generating chamber 12b; a two-port two-position type normally open electromagnetic cut-off valve 55b which is provided in a passage 55f hydraulically connecting the passage 33 to the passage 37, to hydraulically isolate the rear right wheel brake 38 selectively from the pressure generating chamber 12b; a two-port two-position type normally closed electromagnetic cut-off valve 55c which is provided in a passage 55g hydraulically connecting the passage 35 to a passage 39, to hydraulically connect the front left wheel brake 36 selectively to a low back pressure reservoir 40; and a two-port two-position type normally closed electromagnetic cut-off valve 55d which is provided in a passage 55h hydraulically connecting the passage 37 to the passage 39, to hydraulically connect the rear right wheel brake 38 selectively to the low back pressure reservoir 20.

Similarly as in the case of the first embodiment, the system has an electronic control unit to electrically operate the electromagnetic cut-off valves 54a through 54d and 55a through 55d, and an electric motor 22.

Upon depression of the brake pedal 10, the brake fluid in the pressure generating chamber 12a of the master cylinder 12 is supplied through the passage 13, the control valve 54 and the passage 15 to the front right wheel brake 16 and through the passage 13, the control valve 54 and the passage 17 to the rear left wheel brake 18, while the brake fluid in the pressure generating chamber 12b is supplied through the passage 33, the control valve 55 and the passage 35 to the front left wheel brake 36 and through the passage 33, the control valve 55 and the passage 37 to the rear right wheel brake 38. In this operation, the brake fluid in the passage 13 flows through the electromagnetic cut-off valve 54a to the passage 15 and through the electromagnetic cut-off valve 54b to the passage 17, while the brake fluid in the passage 33 flows through the electromagnetic cut-off valve 55a to the passage 35 and through the electromagnetic cut-off valve 55b to the passage 37.

When the brake pedal 10 is released, the pressure generating chambers 12a and 12b are decreased in hydraulic pressure. Hence, the brake fluid in the front right wheel brake 16 returns through the passages 15 and 13 to the pressure generating chamber 12a, and the brake fluid in the rear left wheel brake 18 returns through the passages 17 and 13 to the pressure generating chamber 12a; while the brake fluid in the front left wheel brake 36 returns through the passages 35 and 33 to the pressure generating chamber 12b, and the brake fluid in the rear right wheel brake 38 returns through the passages 37 and 33 to the pressure generating chamber 12b, as a result of which, the four wheel brakes 16, 18, 36 and 38 are decreased in hydraulic pressure. In this operation, the brake fluid in the passage 15 flows not only through the electromagnetic cut-off valve 54a to the passage 13 but also through a bypass passage 29 to the passage 13, and the brake fluid in the passage 17 flows not only through the electromagnetic cut-off valve 54b to the passage 13 but also through a bypass passage 31 to the passage 13; while the brake fluid in the passage 35 flows not only through the electromagnetic cut-off valve 55a to the passage 33 but also through a bypass passage 48 to the passage 13, and the brake fluid in the passage 37 flows not only through the electromagnetic cut-off valve 55b to the passage 33 but also through a bypass passage 50 to the passage 33.

When, with the brake pedal 10 depressed, for instance the electromagnetic cut-off valves 54a and 54c are operated and the electric motor 22 is operated, the front right wheel brake 16 is hydraulically isolated from the pressure generating chamber 12a and hydraulically connected to the low back pressure reservoir 20. As a result, the brake fluid in the front right wheel brake 16 flows through the electromagnetic cut-off valve 54c into the low back pressure reservoir 20; that is, the front right wheel brake is decreased in hydraulic pressure. The brake fluid flowing into the low back pressure reservoir 20 is caused to flow into the front right wheel brake 16 and the rear left wheel brake 18 by the operation of the pump 21. In this operation, since the flow rate of the brake fluid flowing into the front right wheel brake 16 by the operation of the pump 21 is made smaller than the flow rate of the brake fluid flowing from the front right wheel brake 16 into the low back pressure reservoir 20, the decreasing in hydraulic pressure in the front right wheel brake 16 is continued. When the electromagnetic cut-off valve 54c is released, the flow of brake fluid from the front right wheel brake 16 to the low back pressure reservoir 20 is stopped, and the front right wheel brake 16 is maintained hydraulically isolated from the pressure generating chamber 12a and the low back pressure reservoir 20, so that the front right wheel brake is reincreased in hydraulic pressure as the brake fluid flows into it by the operation of the pump 21. When the electromagnetic cut-off valve 54a is also released, the brake fluid in the pressure generating chamber 12a is supplied into the front right wheel brake 16, so that the latter 16 is quickly increased in hydraulic pressure.

When the electromagnetic cut-off valves 54b and 54d are operated during the control of the hydraulic pressure in the front right wheel brake 16, the rear left wheel brake 18 is maintained hydraulically isolated from the pressure generating chamber 12a and hydraulically connected to the low back pressure reservoir 20, so that the brake fluid in the rear left wheel brake 18 flows into the low back pressure reservoir 20. In this operation, since the flow rate of the brake fluid flowing into the rear left wheel brake 18 by the operation of the pump 21 is made smaller than the flow rate of the brake fluid flowing from the rear left wheel brake 18 into the low back pressure reservoir 20, the rear left wheel brake 28 is decreased in hydraulic pressure. When the electromagnetic cut-off valve 54d is released, the flow of brake fluid from the rear left wheel brake 18 to the low back pressure reservoir 20 is stopped, and the rear left wheel brake 18 is reincreased in hydraulic pressure as the brake fluid flows into it by the operation of the pump 21. When the electromagnetic cut-off valve 54b is also released, the brake fluid in the pressure generating chamber 12a is supplied into the front right wheel brake 16, so that the latter 16 is quickly increased in hydraulic pressure.

Similarly as in the above-described case, the hydraulic pressure in the front left wheel brake 36 and the hydraulic pressure in the rear right wheel brake 38 can be individually decreased or reincreased by driving the pump 41 and by operating the electromagnetic cut-off valves 55a through 55d.

Similarly as in the above-described first embodiment, in the case where the four wheel brakes 16, 18, 36 and 38 are increased in hydraulic pressure by depressing the brake pedal 20, the rear right wheel brake 18 and the rear right wheel brake 38 can be made lower in hydraulic pressure than the front right wheel brake 16 and the front left wheel brake 36 by operating the electromagnetic cut-off valves 54b and 55b.

Fourth Embodiment

Figure 4:
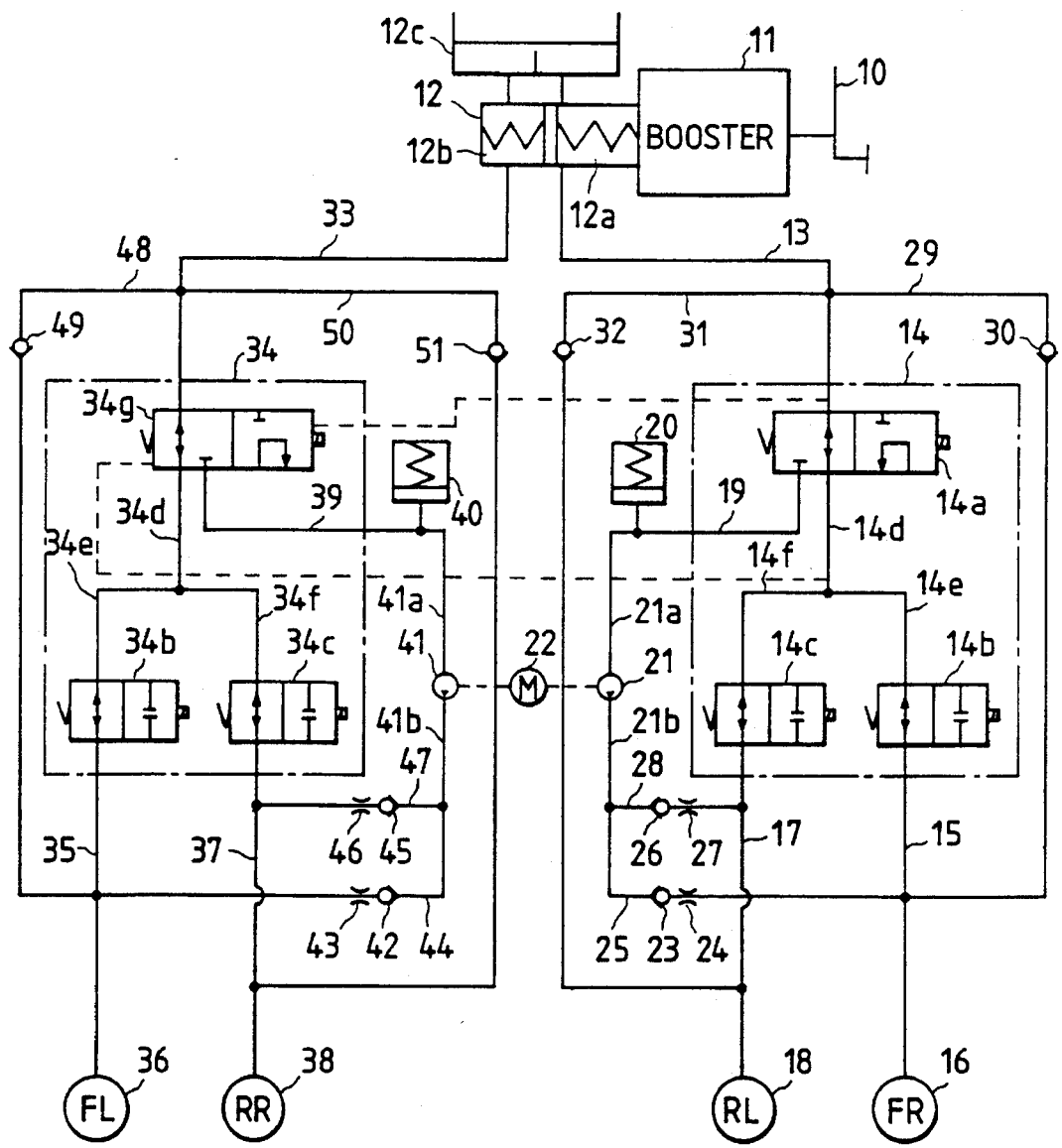
FIG. 4 is another example of the hydraulic brake system, which constitutes a fourth embodiment of the invention.

A fourth embodiment of the invention is as shown in FIG. 4. As is apparent from comparison of FIG. 4 with FIG. 1, the fourth embodiment is obtained by replacing the electromagnetic change-over valve 34a of the first embodiment with a pressure response change-over valve 34g which operates as follows: When the hydraulic pressure in the passage 14d becomes lower than that in the passage 13; that is, when the electromagnetic change-over valve 14 is operated with the brake pedal 10 depressed, the pressure response change-over valve 34g operates in response to the pressure difference between the passage 14d and the passage 13.

In the fourth embodiment, with the brake pedal depressed, the front right wheel brake 16 and the rear left wheel brake 18 can be individually decreased or reincreased in hydraulic pressure by operating the electromagnetic change-over valve 14a and the electromagnetic cut-off valves 14b and 14c and by driving the pump 21 with the electric motor 22. And, by operating the electromagnetic cut-off valves 34c and 43c under the condition that the front right wheel brake 16 and the rear left wheel brake 16 are being controlled in hydraulic pressure, the front left wheel brake 36 and the rear right wheel brake 38 can be individually decreased or reincreased in hydraulic pressure.

Fifth Embodiment

Another example of the hydraulic brake system, which constitutes a fifth embodiment of the invention, will be described with reference to FIG. 5. The hydraulic brake system is provided for an FR vehicle (front-engine rear-drive vehicle) in which a front left wheel brake for applying a braking force to the front left wheel which is a driven wheel and a front right wheel brake for applying a braking force to the front right wheel which is also a driven wheel are hydraulically connected to a first pressure generating chamber of a tandem master cylinder, and a rear right wheel brake for applying a braking force to the rear right wheel which is a driving wheel and a rear left wheel brake for applying a braking force to the rear left wheel which is also a driving wheel are hydraulically connected to a second pressure generating chamber of the master cylinder.

Figure 5:
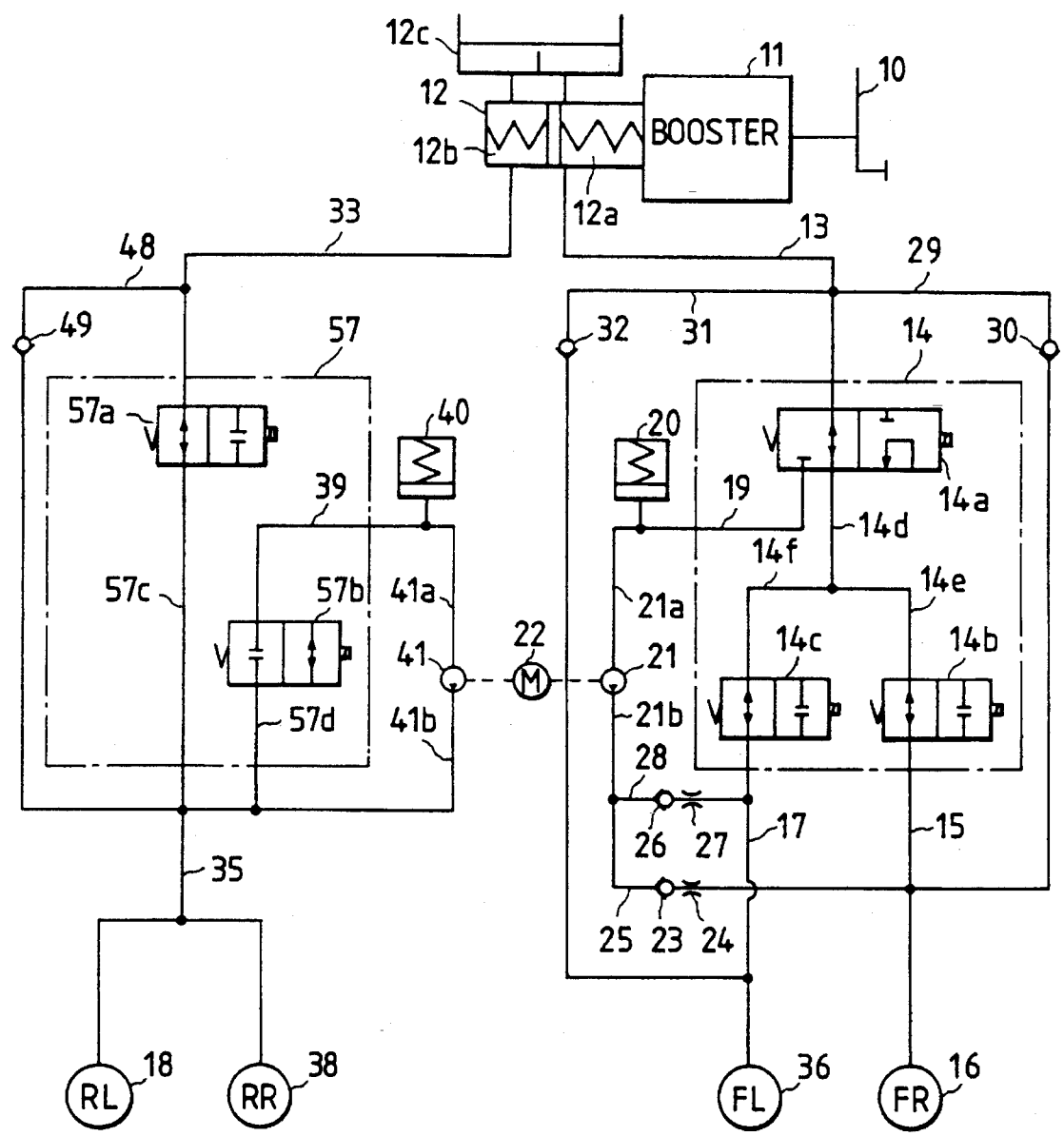
FIG. 5 is another example of the hydraulic brake system, which constitutes a fifth embodiment of the invention.

In FIG. 5, parts corresponding functionally to those which have been described with reference to FIG. 1 showing the first embodiment, are therefore designated by the same reference numerals or characters. As shown in FIG. 5, the system has a master cylinder 12 comprising pressure generating chambers 12a and 12b. The pressure generating chamber 12a is hydraulically connected through a passage 13, a control valve 14 and a passage 15 to a front right wheel brake 16, and through the passage 13, the control valve 14 and a passage 17 to a front left wheel cylinder 36, while the pressure generating chamber 12b is hydraulically connected through a passage 33, a control valve 57 and a passage 35 to both a rear left wheel brake 18 and a rear right wheel brake 38.

The control valve 57 comprises a two-port two-position type normally open electromagnetic cut-off valve 57a and a two-port two-position type normally closed type electromagnetic cut-off valve 57b. The electromagnetic cut-off valve 57a is provided in a passage 57c hydraulically connecting the passage 33 to the passage 35, to hydraulically isolate the rear left wheel brake 18 and the rear right wheel brake 38 selectively and simultaneously from the pressure generating chamber 12b. The electromagnetic cut-off valve 57b is provided in a passage 57d hydraulically connecting the passage 35 to a passage 39, to hydraulically connect the rear left wheel brake 18 and the rear right wheel brake 38 selectively and simultaneously to a low back pressure reservoir 40.

In the fifth embodiment, with the brake pedal 10 depressed, the front right wheel brake 16 and the front left wheel brake 36 can be individually decreased or reincreased in hydraulic pressure by operating the electromagnetic change-over valve 14a and the electromagnetic cut-off valves 14b and 14c and by driving the pump 21 with the electric motor 22. And, by operating the electromagnetic cut-off valves 57a and 57b and by driving the pump 41 with the electric motor 22, the rear left wheel brake 18 and the rear right wheel brake 38 can be simultaneously decreased or reincreased in hydraulic pressure.

Sixth Embodiment

Another example of the hydraulic brake system, which constitutes a sixth embodiment of the invention will be described with reference to FIG. 6. The hydraulic brake system is for an FR vehicle (front-engine rear-drive vehicle) in which a front left wheel brake for applying a braking force to the front left wheel which is a driven wheel and a front right wheel brake for applying a braking force to the front right wheel which is also a driven wheel are hydraulically connected to a first pressure generating chamber of a tandem master cylinder, and a rear right wheel brake for applying a braking force to the rear right wheel which is a driving wheel and a rear left wheel brake for applying a braking force to the rear left wheel which is also a driving wheel are hydraulically connected to a second pressure generating chamber of the master cylinder. The hydraulic brake system is so designed that it is able to decrease or reincrease the hydraulic pressures of the wheel brakes for anti-lock control, and to apply hydraulic pressure to the rear right wheel brake and the rear left wheel brake for traction control that braking force is applied to the rear right wheel and the rear left wheel to prevent those wheels from idling when the vehicle starts to move or increases speed.

Figure 6:
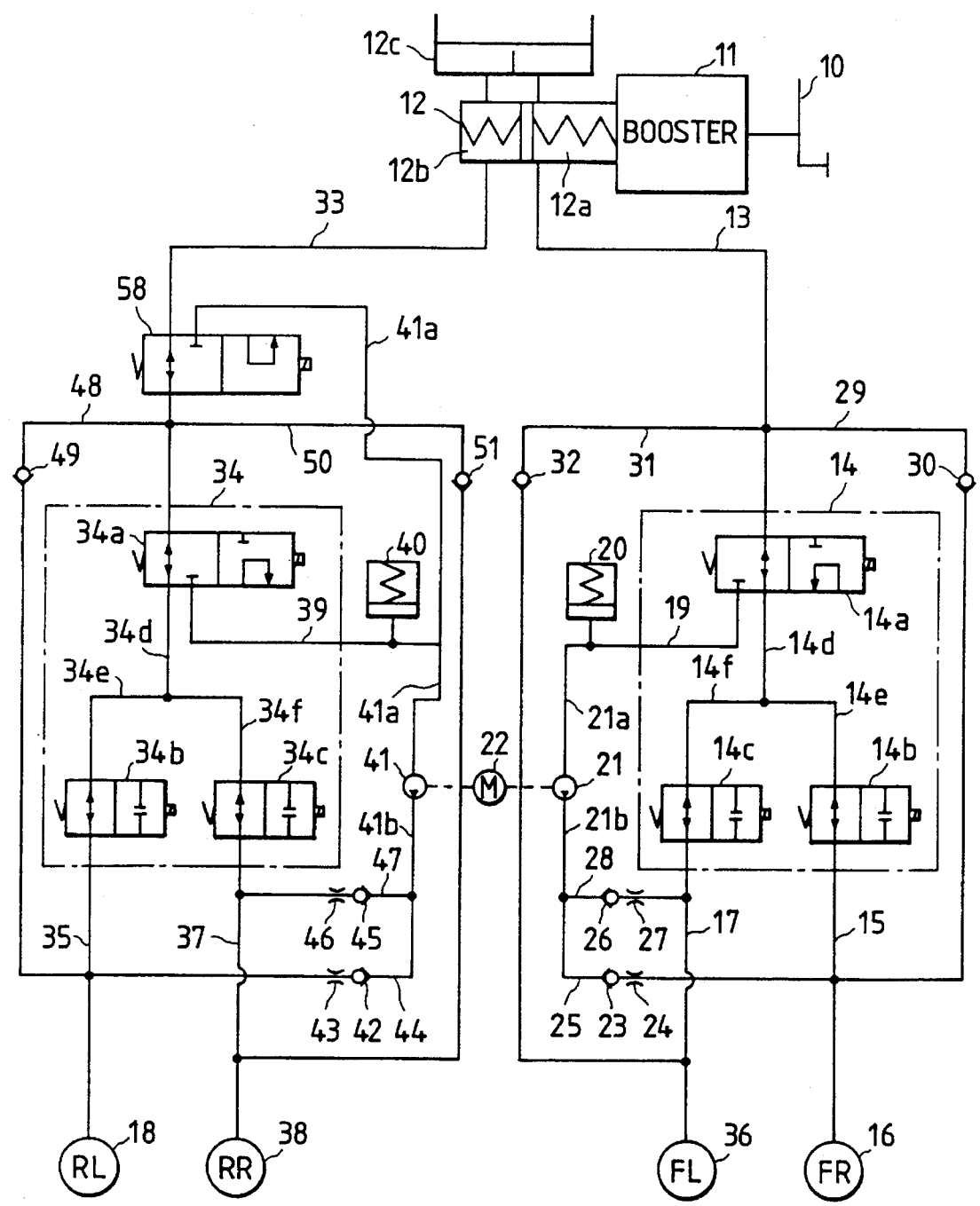
FIG. 6 is another example of the hydraulic brake system, which constitutes a sixth embodiment of the invention.

In FIG. 6, parts corresponding functionally to those which have been described with reference to FIG. 1 showing the first embodiment, are therefore designated by the same reference numerals or characters. As shown, in FIG. 6, the system has a master cylinder 12 including two pressure generating chambers 12a and 12b. The pressure generating chamber 12a is hydraulically connected through a passage 13, a control valve 14 and a passage 15 to a front right wheel brake 16 and through the passage 13, the control valve 14 and a passage 17 to a front left wheel brake 36; while the pressure generating chamber 12b is hydraulically connected through a passage 33, a control valve 34 and a passage 35 to a rear left wheel brake 18 and through the passage 33, the control valve 34 and a passage 37 to a rear right wheel brake 38.

A three-port two-position type electromagnetic change-over valve 58 is provided in the passage 33 at the position which is closer to the pressure generating chamber 12b than the hydraulically connecting point of bypass passages 48 and 50. When the electromagnetic change-over valve 58 is operated, the bypass passages 48 and 50 and the control valve 34 are hydraulically isolated from the pressure generating chamber 12b, while the inlet passage 41a of the pump 41 is hydraulically connected to the passage 33.

In the sixth embodiment, with the brake pedal 10 depressed, the front right wheel brake 16 and the front left wheel brake 36 can be individually decreased or reincreased in hydraulic pressure by operating the electromagnetic change-over valve 14a and the electromagnetic cut-off valves 14b and 14c and by driving the pump 21 with the electric motor 22. And, by operating the electromagnetic change-over valve 34a and the electromagnetic cut-off valves 34b and 34c and by driving the pump 41 with the electric motor 22, the rear left wheel brake 18 and the rear right wheel brake 38 can be individually decreased or reincreased in hydraulic pressure.

In the case where the rear left wheel brake and/or the rear right wheel brake tends to spin when the vehicle starts to move or increases speed, control is made as follows: That is, the electromagnetic change-over valve 34a is operated and the electromagnetic cut-off valve 34b and/or the electromagnetic cut-off valve 34c is operated, and the electric motor 22 is operated to drive the pump 41, and the electromagnetic change-over valve 58 is operated. When, as was described above, the electromagnetic cut-off valve 34b and/or the electromagnetic cut-off valve 34c is operated, and the electromagnetic change-over valve 58 is operated, then the brake fluid is prevented from flowing out of the rear left wheel brake 18 and/or the rear right wheel brake 38. In addition, when the electromagnetic change-over valve 58 is operated in the above-described manner, the inlet passage 41a of the pump 41 is hydraulically connected to the passage 33, so that the pump 41, being driven by the motor 22, draws the brake fluid from a master cylinder reservoir 12c through the pressure generating chamber 12b and supplies it to the rear left wheel brake 18 and the rear right wheel brake 38. As a result, the rear left wheel brake 18 and/or the rear right wheel brake 38 is increased in hydraulic pressure, so that the rear left wheel and/or the rear right wheel which tends to spin is braked; that is, the tendency for those wheels to spin is eliminated. If, in this case, for instance the rear right wheel does not tend to spin, then the electromagnetic cut-off valve 34c is not operated, and therefore the brake fluid supplied to the rear right wheel brake 38 by the pump 41 flows through the electromagnetic cut-off valve 34c and the electromagnetic change-over valve 34a to the low back pressure reservoir 40, so that the rear right wheel brake 38 is not increased in hydraulic pressure.

In suppressing the idling of the rear left wheel and/or the rear right wheel, the rear left wheel brake 18 and/or the rear right wheel brake 38 can be increased or decreased in hydraulic pressure by controlling the operations of the electromagnetic cut-off valves 34b and 34c.

As was described above, in the hydraulic brake system of the invention, with the aid of the control valve, the brake fluid in the first wheel brake and the brake fluid in the second wheel brake, which are hydraulically connected to the one pressure generating chamber of the master cylinder, are caused to individually flow into the one low back pressure reservoir, so that the two wheel brakes are individually decreased in hydraulic pressure; and with the aid of the one pump driven by the one electric motor, the brake fluid in the low back pressure reservoir is caused to flow, in a distribution mode, through the two check valve and the two orifices. In addition, with the aid of the control valve, the two wheel brakes are individually hydraulically isolated from the low back pressure reservoir, so that the two wheel brakes are individually reincreased in hydraulic pressure. That is, in the system, the two wheel brakes are individually decreased or reincreased in hydraulic pressure. In addition, the system is low in manufacturing cost, being operable with only one low back pressure reservoir and only one pump.

In the system of the invention, the control valve is so designed that the two wheel brakes can be decreased or reincreased in hydraulic pressure with one electromagnetic change-over valve and two electromagnetic cut-off valve or three electromagnetic cut-off valves, which further reduces the manufacturing cost of the system.

While there has been described in connection with the preferred embodiments of this invention, it will be obvious to those skilled in the art that various changes and modifications may be made therein without departing from the invention, and it is claimed, therefore, to cover in the appended claims all such changes and modifications as fall within the true spirit and scope of the invention.

What is claimed is:

1. A hydraulic brake system for a vehicle comprising:

first and second wheel brakes;

a master cylinder having a pressure generating chamber therein;

a passage through which said first and second wheel brakes are hydraulically connected to said pressure generating chamber in said master cylinder;

a low back pressure reservoir;

a pump for pumping brake fluid in said low back pressure reservoir into said first and second wheel brakes;

a control valve provided in said passage, in which, when said control valve hydraulically isolates said first and second wheel brakes from said pressure generating chamber and hydraulically connects said first and second wheel brakes to said low back pressure reservoir, the brake fluid in said first wheel brake and the brake fluid in said second wheel brake flow into said low back pressure reservoir so that said first and second wheel brakes are decreased in hydraulic pressure, and when said control valve hydraulically isolates said first and second wheel brakes from said pressure generating chamber and said low back pressure reservoir, and said pump pumps the brake fluid in said low back pressure reservoir into said first and second wheel brakes, said first and second wheel brakes are reincreased in hydraulic pressure;

a first check valve and a first orifice through which the brake fluid in said low back pressure reservoir flows into said first wheel brake by said pump; and a second check valve and a second orifice through which the brake fluid in said low back pressure reservoir flows into said second wheel brake by said pump;

said control valve allowing hydraulic pressure in said first and second wheel brakes to be individually decreased by hydraulically isolating said first and second wheel brakes from said pressure generating chamber and hydraulically connecting said first and second wheel brakes to said low back pressure reservoir, and allowing hydraulic pressure in said first and second wheel brakes to be individually reincreased by hydraulically isolating said first and second wheel brakes from said pressure generating chamber and said low back pressure reservoir, said control valve including an electromagnetic change-over valve movable between one position for hydraulically connecting the pressure generating chamber to the first and second wheel brakes and another position in which said first and second wheel brakes are hydraulically isolated from the pressure generating chamber and are hydraulically connected to said low back pressure reservoir; and wherein the flow rate of the brake fluid caused to flow into said first wheel brake by said pump is smaller than the flow rate of the brake fluid which is caused to flow from said first wheel brake into said low back pressure reservoir, and the flow rate of the brake Fluid which is caused to flow into said second wheel brake by said pump is smaller than the flow rate of the brake fluid which is caused to flow from said second wheel brake into said low back pressure reservoir.

2. A system as claimed in claim 1, in which said control valve comprises:

a first normally open electromagnetic cut-off valve for causing said first wheel brake to be hydraulically isolated from said electromagnetic change-over valve; and a second normally open electromagnetic cut-off valve for causing said second wheel brake to be hydraulically isolated from said electromagnetic change-over valve, said second normally open electromagnetic cut-off valve being operable independently of said first normally open electromagnetic cut-off valve.

3. A system as claimed in claim 2, wherein each of said cut-off valves is a two-postion, two-port electromagnetic valve.

4. A system as claimed in claim 1, wherein said passage is a main passage, said main passage being provided with first and second bypass passages, a third check valve provided in said first bypass passage for allowing only the flow of brake fluid from the first wheel brake to the pressure generating chamber, and a fourth check valve provided in said second bypass passage for allowing only the flow of brake fluid from the second wheel brake to the pressure generating chamber.

5. A system as claimed in claim 1, wherein said electromagnetic change-over valve is a two-position, three-port electromagnetic valve.

6. A hydraulic brake system for a vehicle comprising:

first and second wheel brakes;

a master cylinder having a pressure generating chamber therein;

a passage through which said first and second wheel brakes are hydraulically connected to said pressure generating chamber in said master cylinder;

a low back pressure reservoir;

a pump for pumping brake fluid in said low back pressure reservoir into said first and second wheel brakes;

a control valve provided in said passage, in which, when said control valve hydraulically isolates said first and second wheel brakes from said pressure generating chamber and hydraulically connects said first and second wheel brakes to said low back pressure reservoir, the brake fluid in said first wheel brake and the brake fluid in said second wheel brake flow into said low back pressure reservoir so that said first and second wheel brakes are decreased in hydraulic pressure, and when said control valve hydraulically isolates said first and second wheel brakes from said pressure generating chamber and said low back pressure reservoir, and said pump pumps the brake fluid in said low back pressure reservoir into said first and second wheel brakes, said first and second wheel brakes are reincreased in hydraulic pressure;

a first check valve and a first orifice through which the brake fluid in said low back pressure reservoir flows into said first wheel brake by said pump; and a second check valve and a second orifice through which the brake fluid in said low back pressure reservoir flows into said second wheel brake by said pump;

said control valve allowing hydraulic pressure in said first and second wheel brakes to be individually decreased by hydraulically isolating said first and second wheel brakes from said pressure generating chamber and hydraulically connecting said first and second wheel brakes to said low back pressure reservoir, and allowing hydraulic pressure in said first and second wheel brakes to be individually reincreased by hydraulically isolating said first and second wheel brakes from said pressure generating chamber and said low back pressure reservoir, said control valve including a third check valve for allowing only the flow of brake fluid from the pressure generating chamber to said first wheel brake, a fourth check valve for allowing only the flow of brake fluid from the pressure generating chamber to said second wheel brake, and a normally open electromagnetic cut-off valve for isolating said third and fourth check valves from said pressure generating chamber; and wherein the flow rate of the brake fluid caused to flow into said first wheel brake by said pump is smaller than the flow rate of the brake fluid which is caused to flow from said first wheel brake into said low back pressure reservoir, and the flow rate of the broke fluid which is caused to flow into said second wheel brake by said pump is smaller than the flow rate of the brake fluid which is caused to flow from said second wheel brake into said low back pressure reservoir.

7. A system as claimed in claim 6, in which said control valve comprises:

a fifth check valve for allowing only the flow of brake fluid from said first wheel brake to said pressure generating chamber;

a sixth check valve for allowing only the flow of brake fluid from said second wheel brake to said pressure generating chamber;

a first normally closed electromagnetic cut-off valve for hydraulically connecting said first wheel brake to said low back pressure reservoir; and a second normally closed electromagnetic cut-off valve for hydraulically connecting said second wheel brake to said low back pressure reservoir, said second normally closed electromagnetic cut-off valve being operable independently of said first electromagnetic cut-off valve.

* * * * *